(12) United States Patent
Spalt

(10) Patent No.: US 9,339,974 B2
(45) Date of Patent: May 17, 2016

(54) APPLICATION OF ADDITIVE MANUFACTURING PROCESSES TO EFFICIENTLY ACHIEVE HIGHER LEVELS OF HARDWARE INTEGRATION

(71) Applicant: Raytheon Company, Waltham, MA (US)

(72) Inventor: Geoffrey Chad Spalt, Tucson, AZ (US)

(73) Assignee: Raytheon Company, Waltham, MA (US)

(*) Notice: Subject to any disclaimer, the term of this patent is extended or adjusted under 35 U.S.C. 154(b) by 33 days.

(21) Appl. No.: 14/049,050

(22) Filed: Oct. 8, 2013

(65) Prior Publication Data

US 2015/0099025 A1    Apr. 9, 2015

(51) Int. Cl.
*B29C 67/00* (2006.01)

(52) U.S. Cl.
CPC ......... *B29C 67/0088* (2013.01); *B29C 67/0062* (2013.01)

(58) Field of Classification Search
CPC .................. B29C 67/0088; B29C 67/0062
USPC ............................................. 425/166; 700/119
See application file for complete search history.

(56) References Cited

U.S. PATENT DOCUMENTS

| | | | |
|---|---|---|---|
| 5,764,521 A * | 6/1998 | Batchelder | B29C 41/36 156/244.21 |
| 5,866,058 A * | 2/1999 | Batchelder | B29C 67/0055 264/237 |
| 6,103,176 A * | 8/2000 | Nguyen | B29C 41/12 264/308 |
| 6,275,157 B1 * | 8/2001 | Mays | B32B 17/06 340/572.5 |
| 6,471,800 B2 * | 10/2002 | Jang | B29C 67/0081 156/155 |
| 6,822,609 B2 * | 11/2004 | Mendolia | B29C 45/14655 29/600 |
| 6,976,627 B1 * | 12/2005 | Culp | G06K 7/10 235/462.01 |
| 8,070,473 B2 * | 12/2011 | Kozlak | B29C 67/0051 425/135 |
| 8,858,856 B2 * | 10/2014 | Kozlak | G06K 17/00 264/259 |
| 2004/0024482 A1 * | 2/2004 | White | H01L 21/4882 700/119 |
| 2004/0164436 A1 * | 8/2004 | Khoshnevis | B29C 67/0055 264/31 |
| 2004/0175450 A1 * | 9/2004 | Yanagisawa | B29C 41/20 425/135 |
| 2005/0012247 A1 * | 1/2005 | Kramer | B29C 67/0059 264/401 |

(Continued)

*Primary Examiner* — Yogendra Gupta
*Assistant Examiner* — Emmanuel S Luk

(57) ABSTRACT

A fused deposition modeling (FDM) extrusion head is configured to receive control signals from a controller. The FDM extrusion head receives a stream of thermofusible material into an input channel; forces the stream of thermofusible material into a liquefier channel using a mechanical driver; heats the stream of thermofusible material within the liquefier channel to a specified temperature above melting point of the thermofusible material; and receives the heated thermofusible material from an outlet of the liquefier channel and expels the heated thermofusible material through an extrusion tip. The controller determines at least one specified location to deposit the heated thermofusible material according to a coordinate system; cause the extrusion nozzle to selectively deposit a first layer of the heated thermofusible material onto a build platform; and after thermal fusion of the first layer is complete, vertically adjust the distance between the extrusion nozzle and the first layer; and select to deposit a second layer immediately on top of the first layer pause deposit a subassembly, or to pause to receive a subassembly onto at least a portion of the first layer.

20 Claims, 10 Drawing Sheets

(56) References Cited

U.S. PATENT DOCUMENTS

| | | | | |
|---|---|---|---|---|
| 2005/0015175 A1* | 1/2005 | Huang | | B29C 41/02 700/121 |
| 2006/0206227 A1* | 9/2006 | Kritchman | | B29C 67/0059 700/119 |
| 2007/0071902 A1* | 3/2007 | Dietrich | | B29C 67/0055 427/402 |
| 2009/0035405 A1* | 2/2009 | Leavitt | | B29C 47/0021 425/97 |
| 2009/0177309 A1* | 7/2009 | Kozlak | | B29C 67/0051 700/119 |
| 2010/0257792 A1* | 10/2010 | Khoshnevis | | B28B 11/04 52/27 |
| 2011/0076350 A1* | 3/2011 | Khoshnevis | | B29C 47/54 425/204 |
| 2011/0178621 A1* | 7/2011 | Heide | | B29C 67/0055 700/98 |
| 2013/0066812 A1* | 3/2013 | Nehme | | B29C 67/0088 705/400 |
| 2013/0241114 A1* | 9/2013 | Ravich | | B29C 67/0062 264/401 |
| 2013/0249146 A1* | 9/2013 | Zenere | | B29C 67/0088 264/401 |
| 2014/0061974 A1* | 3/2014 | Tyler | | B29C 67/0055 264/401 |
| 2014/0265049 A1* | 9/2014 | Burris | | B23K 26/0807 264/497 |
| 2014/0371895 A1* | 12/2014 | Sadusk | | B33Y 10/00 700/98 |
| 2015/0035198 A1* | 2/2015 | Saba | | B29C 67/0088 264/211.12 |
| 2015/0145158 A1* | 5/2015 | Levine | | B29C 67/0085 264/40.1 |

\* cited by examiner

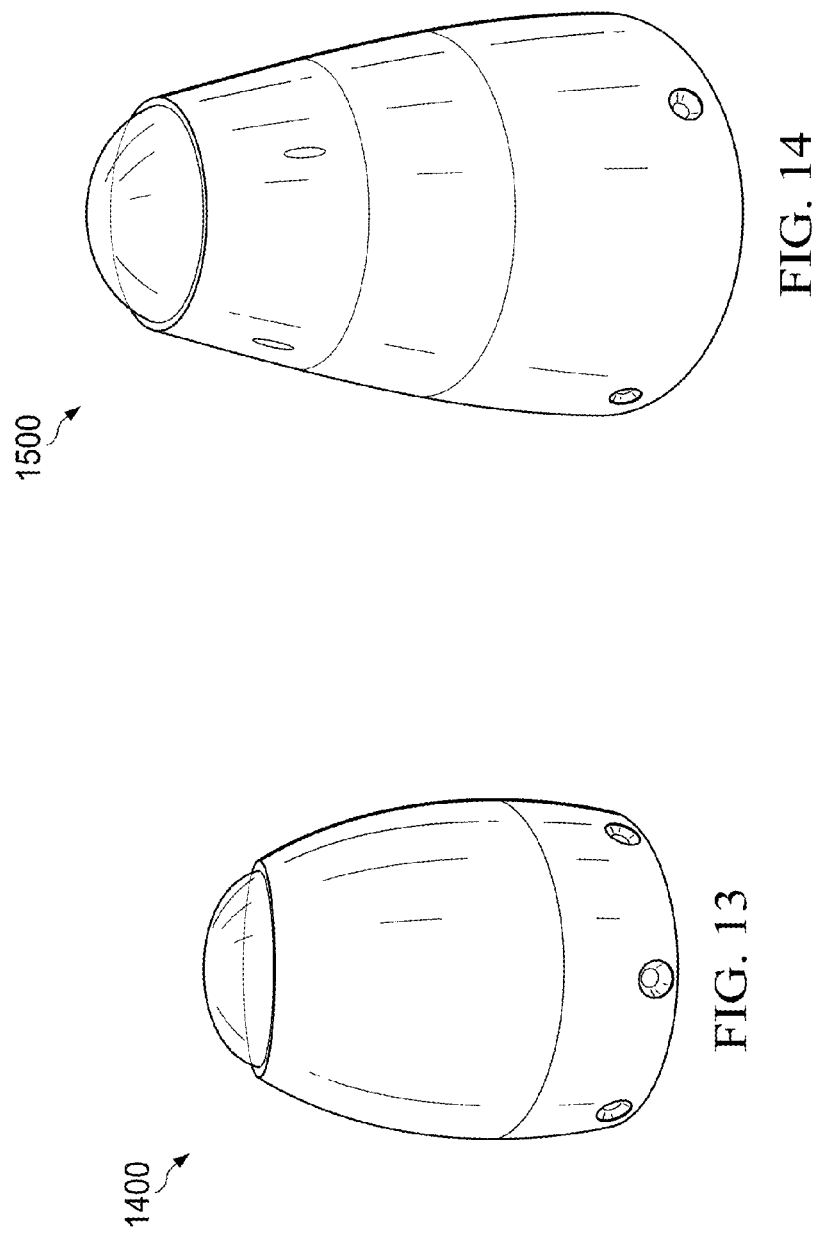

APPLICATION OF ADDITIVE MANUFACTURING PROCESSES TO EFFICIENTLY ACHIEVE HIGHER LEVELS OF HARDWARE INTEGRATION

TECHNICAL FIELD

The present disclosure is directed in general to fused deposition modeling and more specifically to applying additive manufacturing processes to fusion deposition modeling.

BACKGROUND OF THE DISCLOSURE

Fused Deposition Modeling (FDM) technology is a heated material extrusion additive manufacturing (AM) process that uses thermoplastics. FDM is a manufacturing process used to produce three dimensional (3D) conceptual models, prototypes and production parts. FDM can be referred to as 3D printing. In the FDM process, a thermoplastic filament is driven into a liquefier to produce a semi-molten plastic. The semi-molten plastic is extruded through a small diameter heated extrusion nozzle while the heated extrusion nozzle scans a horizontal plane and is selectively deposited onto a build platform to produce a cross section or layer. The build platform is lowered after the completion and thermal fusion of each later until the all layers have been fabricated, meaning FDM of the object is complete. FDM technology is used to fabricate or print individual piece-parts (namely, a part usually manufactured using a machining process).

A missile seeker includes optical elements, detectors, and electronics fixed within a mechanical housing. A military entity uses several types of missile seekers. For example, the missile seekers can have housings of different dimensions and different shapes or profiles. The missile seekers can use the same subcomponents. The various shaped missile seekers can use a common set of optical elements, mechanical and electrical parts. For manufacture of a missile seeker, the housing unique to each type of missile seeker must be procured. Each optical, mechanical or electrical components manually placed into the housing and secured in place by screws, by fasteners, by torqueing, by retainers, or by adhesive bonding. For example, the bottom of one lens is placed atop a ledge of the bottom portion of a lens barrel, and then adhesive bonding material is dispensed atop the lens to mechanically hold the lens in place in the housing.

The missile seeker manufacturing facility must keep an inventory of various housings for each type of missile seeker that the military entity may purchase. In response to a military entity purchase order, the missile seeker manufacturing facility must reconfigure its assembly line machinery and retrain assembly line workers (also referred to as employees) for the type of missile seeker requested. Machine reconfiguration and training employees generate lead time between the time the military entity requests a particular type of missile seeker and the start time of manufacturing the first requested missile seeker. Training employees impacts the risk of error in assembly and quality control, but does not prevent manufacturing variances amount caused by innate imprecision of human capital.

SUMMARY OF THE DISCLOSURE

A fused deposition modeling (FDM) extrusion head is configured to receive control signals from a controller. The FDM extrusion head receives a stream of thermofusible material into an input channel; forces the stream of thermofusible material into a liquefier channel using a mechanical driver; heats the stream of thermofusible material within the liquefier channel to a specified temperature above melting point of the thermofusible material; and receives the heated thermofusible material from an outlet of the liquefier channel and expels the heated thermofusible material through an extrusion tip. The controller determines at least one specified location to deposit the heated thermofusible material according to a coordinate system; cause the extrusion nozzle to selectively deposit a first layer of the heated thermofusible material onto a build platform; and after thermal fusion of the first layer is complete, vertically adjust the distance between the extrusion nozzle and the first layer; and select to deposit a second layer immediately on top of the first layer pause deposit a subassembly, or to pause to receive a subassembly onto at least a portion of the first layer. Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10-14 illustrate various missile seekers having a housing that is capable of being fabricated using the AM FDM process according to embodiments of the present disclosure.

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

The present disclosure describes an example of using additive manufacturing (AM), particularly fused deposition modeling (FDM) processes, to fabricate a missile seeker. However, the embodiments of this disclosure are not limited to missile seekers, but instead can be used to fabricate a mechanical housing around mechanical parts, electromechanical subassemblies, electronics, and optics. Additionally, although reference to military applications is referenced, non-military applications may also avail from teachings of the disclosure.

Figure 1A:
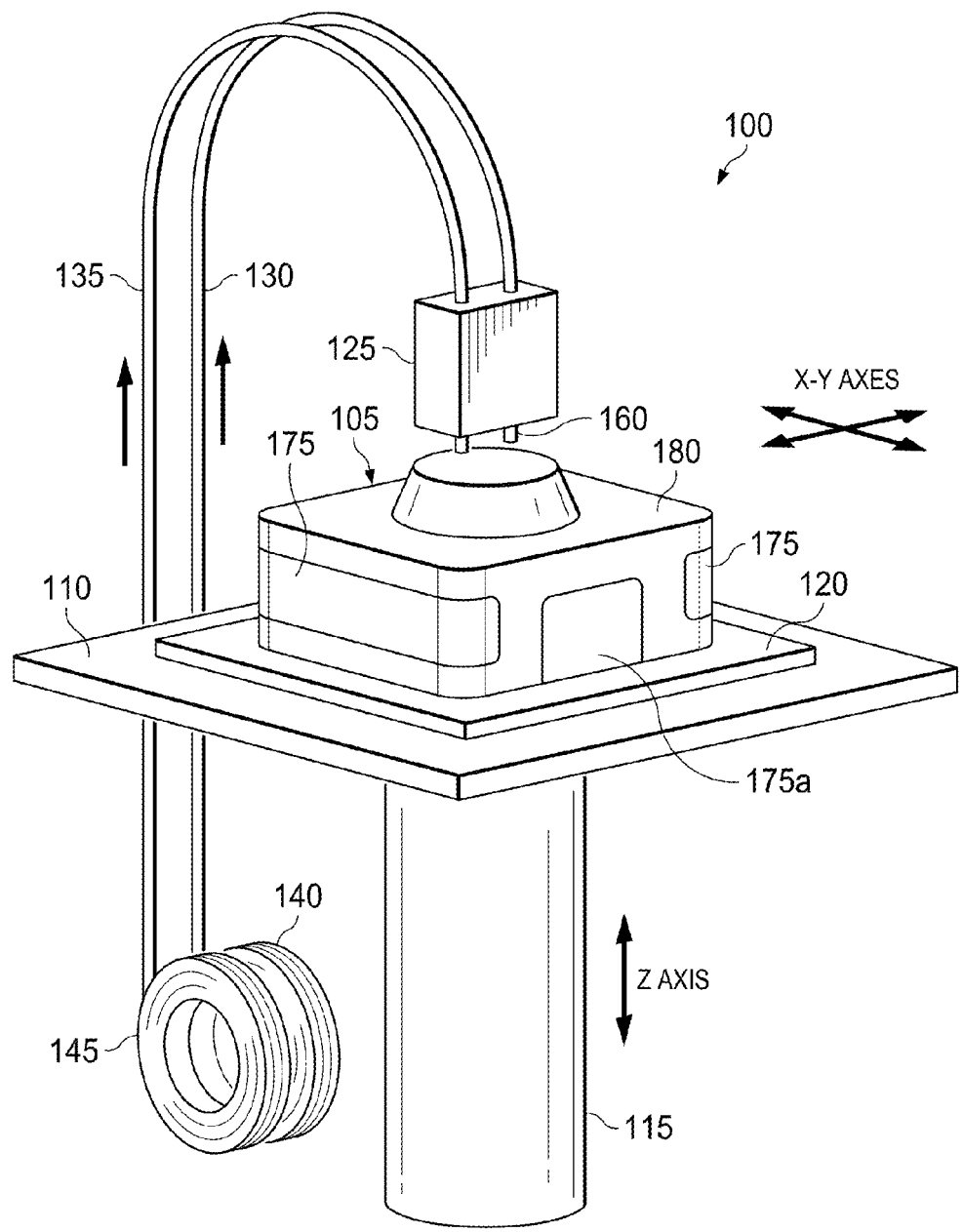
FIG. 1A illustrates a Fused Deposition Modeling (FDM) system with multiple extrusion nozzles according to the present disclosure.
Figure 1B:
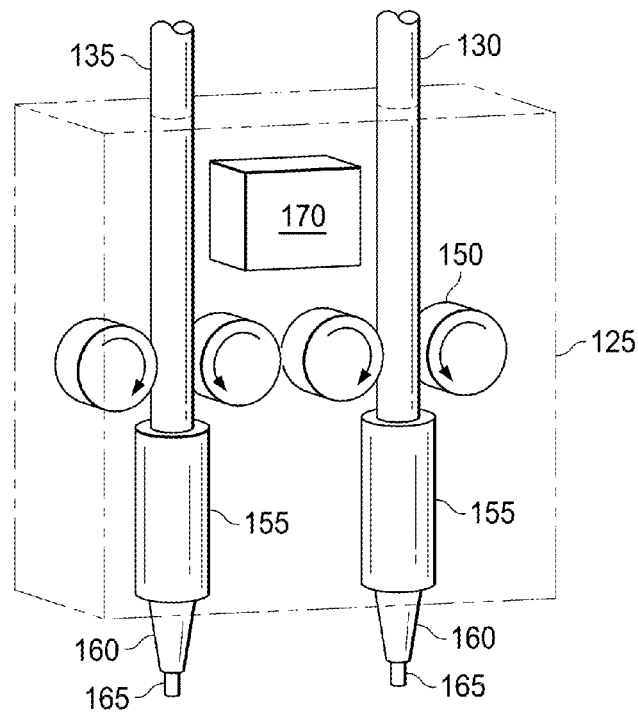
FIG. 1B illustrates a close-up view of the extrusion head of the Fused Deposition Modeling (FDM) system of FIG. 1A.

FIG. 1A illustrates a Fused Deposition Modeling (FDM) system with multiple extrusion nozzles according to the present disclosure. FIG. 1B illustrates a close-up view of the extrusion head of the Fused Deposition Modeling (FDM) system of FIG. 1A. The FDM system 100 is configured to generate a 3D print 105. Although certain details will be provided with reference to the components of the FDM system 100, it should be understood that other embodiments may include more, less, or different components.

The FDM system 100 includes a build platform 110 that is height adjustable by vertical movements of a shaft 115, a foam base 120 disposed on top of the build platform 110, and an extrusion head 125 disposed above, but not in immediate contact with the foam base 120. In certain embodiments, the build platform 110 includes the foam base 120. The shaft 115 raises up to bring the build platform 110 closer in proximity to the extrusion head 125 and lowers to move the build platform 110 away from the extrusion head 125. When the build platform 110 is closest to the extrusion head 125, an initial layer of an object (also referred to as a "part") to be fabricated can be formed. After the initial layer is deposited onto the build platform 110, and after thermal fusion of the layer is complete, the build platform 110 is lowered to allow the extrusion head 125 to deposit the next layer on top of the initial layer. This method of depositing a first layer and thermal fusing the deposited first layer repeats for each respective layer until the part is fabricated in its entirety.

The extrusion head 125 is configured to receive a stream of material through a channel, heat the material, and force the heated material through a small diameter nozzle. As a non-limiting example, the stream of material may include a thermofusible material such as extruded thermoplastic. In other embodiments, the stream of material may include other types of material.

In operation, the extrusion head 125 receives a first stream of material that includes a support material filament 130. At the same time the extrusion head 125 receives a second stream of material that includes a build material filament 135. The support material filament 130 is unwound from a support material spool 140. Similarly, the build material filament 135 is unwound from a build material spool 145.

In certain embodiments, the spools 140, 145 are disposed below the build platform 110, such that the filament 130, 135 is unwound in an upward direction to reach the opening of the input channel of the extrusion head 125. The extrusion head 125 includes multiple drive wheels 150. Certain embodiments include two drive wheels 150 disposed on opposite sides of each stream of material. For example, a first drive wheel 150 disposed on the right side of the support material filament 130 turns in a counterclockwise direction to force the right side of the support material filament 130 into a liquefier 155 channel. A second drive wheel 150 disposed on the left side of the support material filament 130 rotates in a clockwise direction to force the left side of the support material filament 130 into the liquefier 155 channel. The build material filament 135 is forced into a separate liquefier 155 channel by a respective pair of drive wheels spinning in opposite directions of each other. That is, the extrusion head 125 includes one or more liquefiers 155 that heat a solid material into a liquid or semi-molten phase. The liquefier 155 includes a channel configured to receive a stream of solid material, such as a support material filament 130 or a build material filament 135, and to expel the liquefied material into an extrusion nozzle 160. In certain embodiments, the liquefier 155 channel exit is the same size or same shape as the input opening of the extrusion nozzle 160. The extrusion head 125 includes multiple extrusion nozzles 160, and each extrusion nozzle 160 has an extrusion tip 165. The extrusion tip 165 is an outlet through which material is extruded and expelled. The extrusion nozzle 160 is coupled to the exit of the channel of the liquefier 155 and configured to receive the liquefied material. In certain embodiments, the extrusion nozzle 160 is shaped like a funnel. That is, the input opening of the extrusion nozzle 160 that is coupled to the exit of the liquefier 155 channel has a larger diameter than the extrusion tip 165.

Other extrusion heads of other FDM systems can only move or scan horizontally (for example, side-to-side or along an x-axis). In certain other FDM systems, the build platform moves back and forth (for example along a y-axis) and vertically (for example, up and down or along a z-axis). However, the extrusion head 125 of the present disclosure is configured to move in two horizontal directions, namely, along both the x-axis and the y-axis according to an x-y coordinate system. The build platform 110 is configured to ascend and descend (namely, along the z-axis 175).

The FDM system 100 includes a controller 170. The controller 170 is configured to control the functions of the components of the FDM system 100. In certain embodiments, the extrusion head 125 includes the controller 170. In certain embodiments, the controller 170 is coupled to the extrusion head 125. For example, the controller 170 controls the channel of the extrusion head 125, allowing the extrusion head 125 to receive a stream of material, such as a filament 130, 135. The controller 170 controls the start, the stop, speed, and direction of rotation of the each drive wheel 150. The controller 170 instructs each liquefier 155 of the temperature to which to heat the filament 130, 135. The controller 170 can instruct the liquefier 155 corresponding to (namely, disposed to receive) the build material filament 135 to heat to one temperature and instruct the liquefier 155 corresponding to the support material filament 130 to heat to a different temperature.

In operation, the controller 170 causes the extrusion nozzles 160 to selectively deposit liquefied or semi-molten material onto the build platform 110. That is, for each layer, the controller 170 determines one or more specified coordinate positions at which to deposit build material, determines one or more specified coordinate positions at which to deposit support material, and determines one or more specified coordinate positions at which to deposit no material. The controller 170 moves the extrusion head 125 to a specified coordinate position according to the x-y coordinate system. Based on the determination of the specified coordinate positions at which to deposit support material, the controller causes the drive wheels 150 corresponding to the support material to timely force the support material filament toward the extrusion tip 165 to selectively deposit liquefied support material only at the specified coordinate positions for support material. For each layer, the controller 170 can map a series of consecutive positions at which to deposit liquefied support material to generate a path or line at which to deposit the liquefied support material. That is, the controller 170 can instruct the extrusion head 125 to deposit dots of liquefied material or to deposit lines of material. Similarly, based on the determination of the specified coordinate positions at which to deposit build material, the controller 170 causes the drive wheels 150 corresponding to the support material to timely force the support material filament 130 toward the extrusion tip 165 to selectively deposit liquefied build material only at the specified coordinate positions for build material. The controller 170 causes the drive wheels 150 to timely stop forcing the support material filament 130.

In certain embodiments, the controller 170 includes executable instructions stored in a non-transitory machine-usable, computer-usable, or computer-readable medium in any of a variety of forms, wherein the instructions cause the processing circuitry to perform operations for AM processes to achieve higher levels of hardware integration. The processing circuitry includes memory. The memory includes any suitable volatile or non-volatile storage and retrieval device(s). For example, the memory can include any electronic, magnetic, electromagnetic, optical, electro-optical, electro-mechanical, or other physical device that can contain, store, communicate, propagate, or transmit information. The memory can store data and instructions for use by the controller 170.

The 3D print 105 includes part supports 175, 175a and the part 180. The bottom of the part 180 includes a recess filled with support material 175a. Each of the left side and the right side of the part 180 includes a channel filled with support material 175. The bottom layer includes extrusions of support material 175a configured to be removed from the build material upon completion of fabrication of he part in its entirety. That is, upon completion of the 3D print 105, the 3D print 105 undergoes a support material removal process. In certain embodiments, the support material is a soluble material that is removed from the 3D print 105 by dissolution, leaving the part 180 as the remainder. In certain embodiments, the support material removal process includes grinding to remove the support parts 175, 175a. After the support material is removed, the part 180 is a solid object with a recessed channel, dip, crevice, curved portion, or angled portion.

Figure 2:
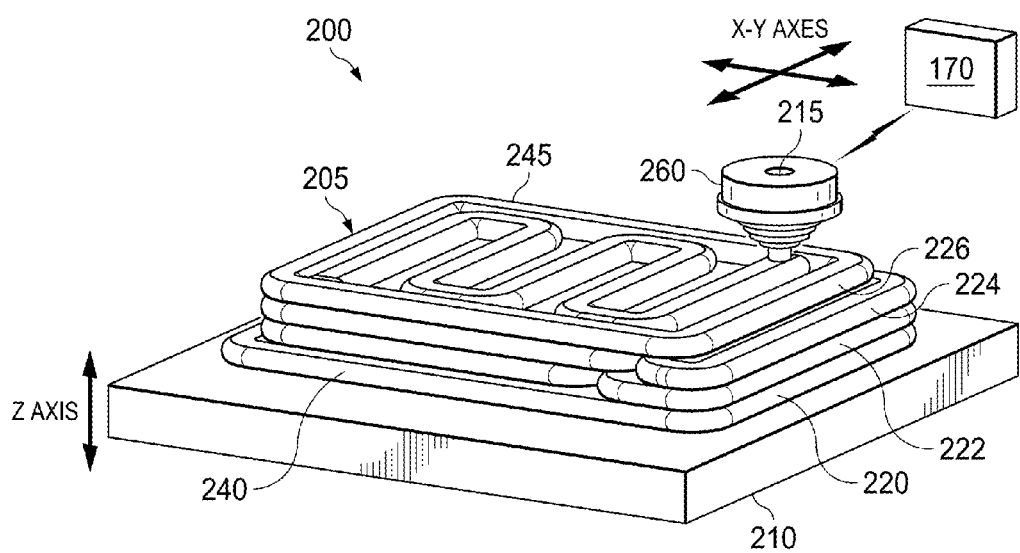
FIG. 2 illustrates a FDM system with a single extrusion nozzle according to the present disclosure.

FIG. 2 illustrates a FDM system 200 with a single extrusion nozzle according to the present disclosure. The FDM system 200 is configured to generate a 3D print 205. Although certain details will be provided with reference to the components of the FDM system 200, it should be understood that other embodiments may include more, less, or different components.

The FDS system 200 includes a build platform 210 configured to translate vertically (shown by the arrow Z, corresponding to the z-axis) and includes the functions of the build platform 110 of FIG. 1A. The FDS system 200 includes a single extrusion nozzle 260 comprising a single extrusion tip 265 through which material is extruded and expelled. The single extrusion nozzle 260 is configured to move throughout a flat plane, such as in two horizontal directions (namely, along both the x-axis and the y-axis) according to an x-y coordinate system.

The extrusion nozzle 260 includes an input channel 215 configured to receive a stream of material, to heat the stream of material in the channel to a specified temperature, and to expel the liquefied material through the tip of the single extrusion nozzle 260. FDS system 200 includes a controller 170 coupled to and configured to control the functions of the single extrusion nozzle 260. The stream of material can include a thermoplastic material used to build the part or other types of material. As described below, the build material 245 includes the thermoplastic material.

In the example shown in FIG. 2, the first layer 220 includes support material 240 deposited in a rectangular shape larger than the outer perimeter of the build material 245. The second layer 222 is disposed directly (that is, without an intermediary) on top of the first layer 220. The second layer 222 includes support material 240 deposited at a portion of the second layer 222 and build material 245 complimentarily deposited at another portion of the second layer 222. For example, the support material 240 of the first, second, and third layers 220, 224, 224 are shaped as a platform with two stair steps atop. As a compliment (for example, like puzzle pieces), the build material 245 of the fourth, third, and second layers 226, 224, 222 are disposed in contact with and in the shape of two inverted stairs beneath a platform. The three layers 220, 222, 224 of support material support the weight and provide an elevated platform for depositing the build material 245 of the fourth layer 226 as a ledge above the third layer 224. The two layers 220, 222 of support material support the weight and provide an elevated platform for depositing the build material 245 of the third layer 226 as a ledge above the second layer 222.

Figure 3:
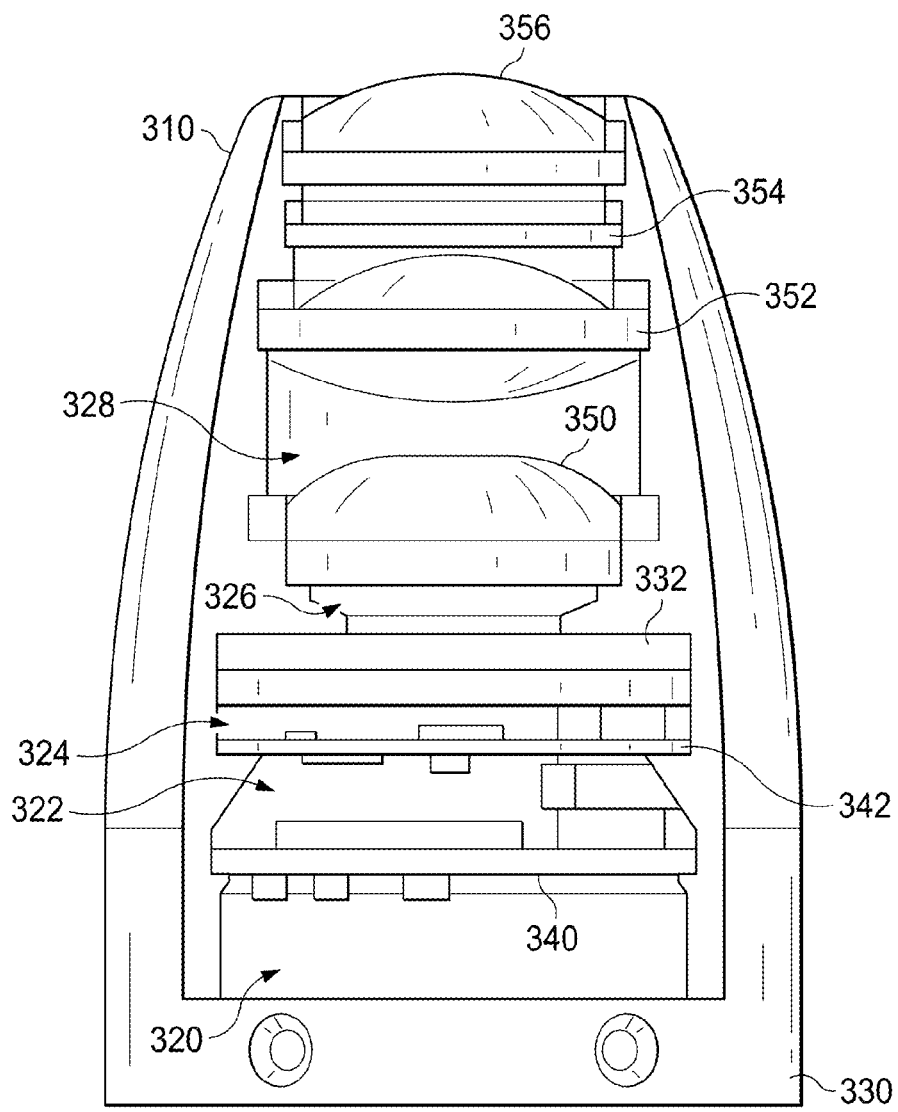
FIG. 3 illustrates a missile seeker having an open-side housing fabricated using the AM FDM process according to embodiments of the present disclosure.

FIG. 3 illustrates a missile seeker 300 having an open-side housing 310 fabricated using the AM FDM process, according to embodiments of the present disclosure. The openness of the open-side housing 310 does not enclose the missile seeker 300 on the side to enable a user to see the empty cavities between the components inserted between manufacturing of the layers of the open-side housing 310, see the mechanical housing "grown" around the mechanical, electrical and optical components, and see the use of spacers to allow printer head movement for material deposition near tall components.

Figure 4:
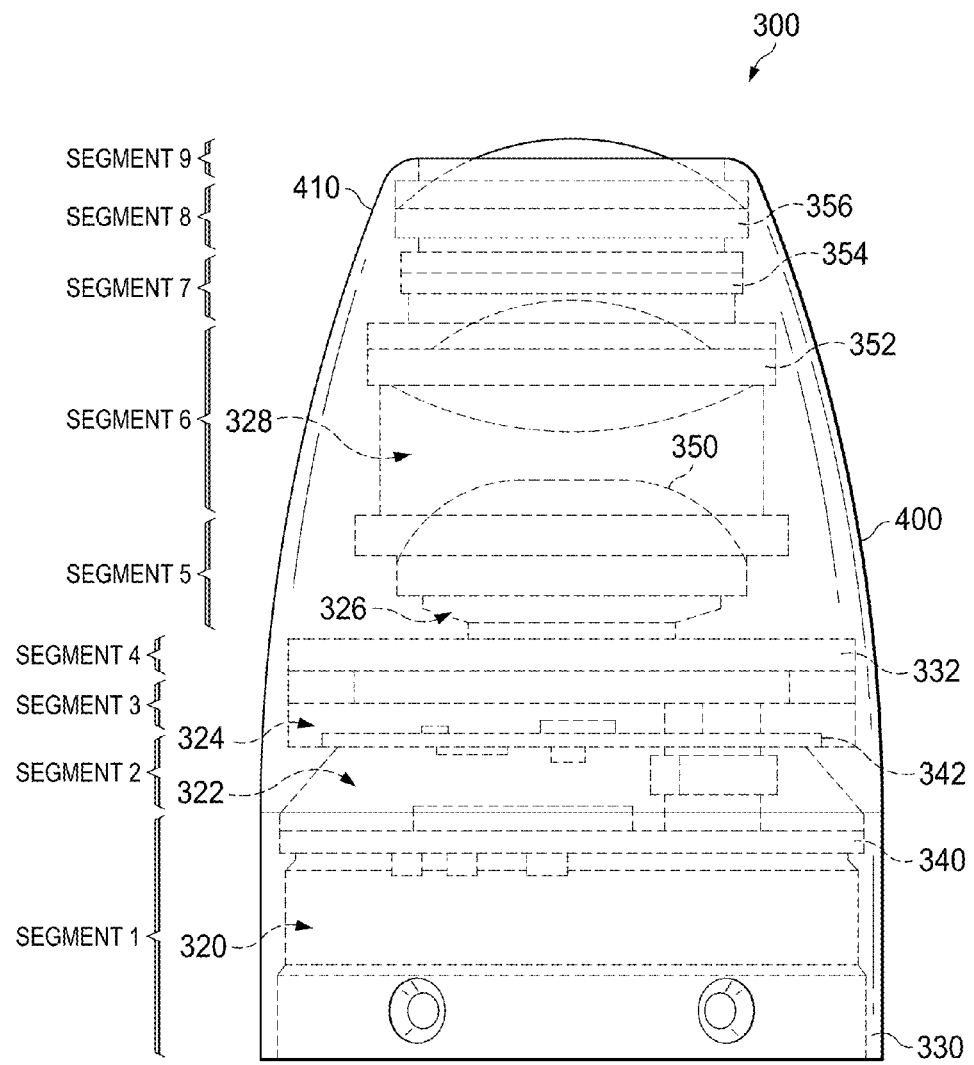
FIG. 4 illustrates a missile seeker of the same type as the missile seeker of FIG. 9 having a closed housing fabricated using the AM FDM process according to embodiments of the present disclosure.
Figure 9:
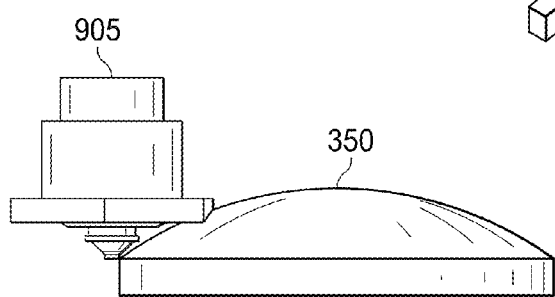
FIG. 9 illustrates an extrusion nozzle in an incorrect, damage-causing disposition relative to a convex lens according to embodiments of the present disclosure.

FIG. 4 illustrates a missile seeker 400 of the same type as the missile seeker 300 of FIG. 9 having a closed housing 410 fabricated using the AM FDM process according to embodiments of the present disclosure.

Referring to FIGS. 3 and 4, a bottom cavity 320 is disposed between the base 330 of the missile seeker 300 and a bottom common circuit card assembly 340 (CCA) disposed a distance above the base 330. A second cavity 322 is disposed between the bottom CCA 340 and a second CCA 342 disposed above the bottom CCA 340. A third cavity 324 is disposed between the second CCA 342 and an electronics housing closure 332 of the housing 310, 410 disposed above the second CCA 342. In the missile seeker 400, the electronics housing closure 332 functions as an enclosing layer that separates segments 1-4 from segments 5-9. A fourth cavity 326 is disposed between the electronics housing closure 332 and the bottom lens 350 disposed above the electronics housing closure 332. Segment 5 includes the bottom lens 350. A fifth cavity 328 is disposed between the bottom lens 350 and the middle lens 352 disposed above the bottom lens 350. Segment 6 includes the middle lens 352. Segment 7 includes the upper lens 354. Segment 8 includes the top lens 356.

Figure 5A:
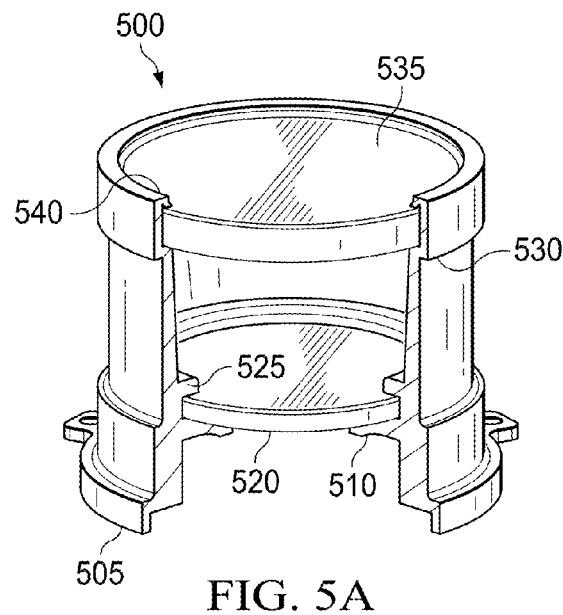
FIGS. 5A, 5B, and 5C illustrate a housing fabricated around multiple lens according to embodiments of the present disclosure.
Figure 5B:
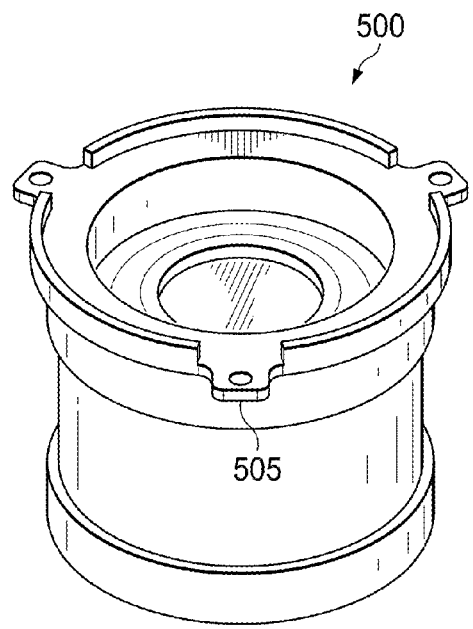
Figure 5C:
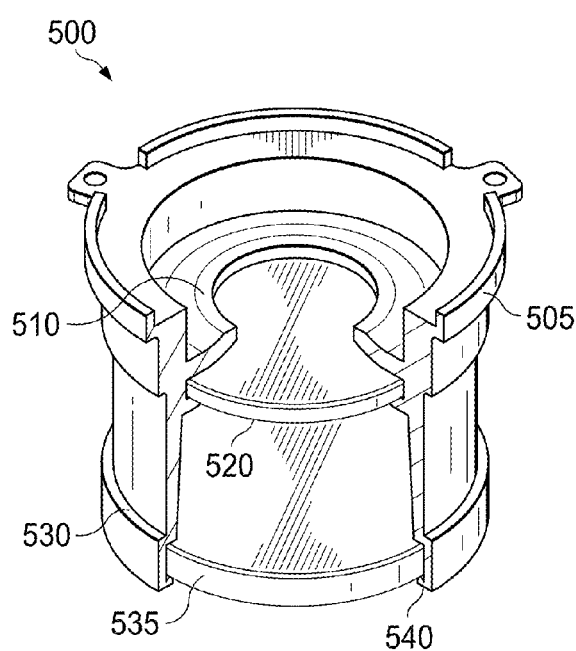

FIGS. 5A, 5B, and 5C illustrate a lens barrel 500 fabricated around multiple lens according to embodiments of the present disclosure. FIG. 5A illustrates a front view of the lens barrel 500 in an upright orientation. FIG. 5B illustrates a bottom view of the back of the lens barrel 500 in an upside-down orientation. FIG. 5C illustrates a bottom view of the front of the lens barrel 500 in an upside-down orientation.

The lens barrel 500 is fabricated using the FDM processes according to embodiments of the present disclosure that generated segments 4-6 of FIG. 4. For example, first, the bottom 505 of the lower layers of the lens barrel 500 is fabricated up through the first ledge 510. Next, the bottom lens 520 is inserted onto the top of the first ledge 510 of the lower layers. The dimensions and shape of the first ledge 510 are configured to receive the bottom lens 520. Next, the middle layers of the lens barrel 500 are fabricated beginning with a second ledge 525 fabricated as the bottom of the middle layers up through the third ledge 530. The second ledge 525 is formed by depositing build material immediately on top of the bottom lens 520. The second ledge 525 secures the bottom lens 520 in a fixed place, thereby eliminates the need for adhesives. The layers of the lens barrel 500 between the first ledge 510 and the second ledge 525 complement (that is, exactly fitted to) the shape and dimensions of the bottom lens 520 to restrain or otherwise capture the lens within the housing.

The dimensions and shape of the third ledge 530 are configured to receive the top lens 535. Next, the top layers of the lens barrel 500 are fabricated beginning with the third ledge 530 fabricated as the bottom of the top layers up through the fourth ledge 540. The third ledge 530 is formed by depositing build material immediately on top of the top lens 535. The third ledge 530 secures the top lens 536 in a fixed place, thereby eliminates the need for adhesives. The layers of the lens barrel 500 between the third ledge 530 and the fourth ledge 540 complement (that is, exactly fitted to) the shape and dimensions of the top lens 535 to restrain the lens within the housing. In other words, the structure of the lens barrel 500 is grown from the bottom up around the lenses, encapsulating the lenses within the cross section of the walls of the housing.

The space between the top lens 535 and the bottom lens 520 is empty throughout fabrication of the lens barrel 500, from start to finish. Fabrication of the lens barrel does not require any support material removal process.

Figure 6A:
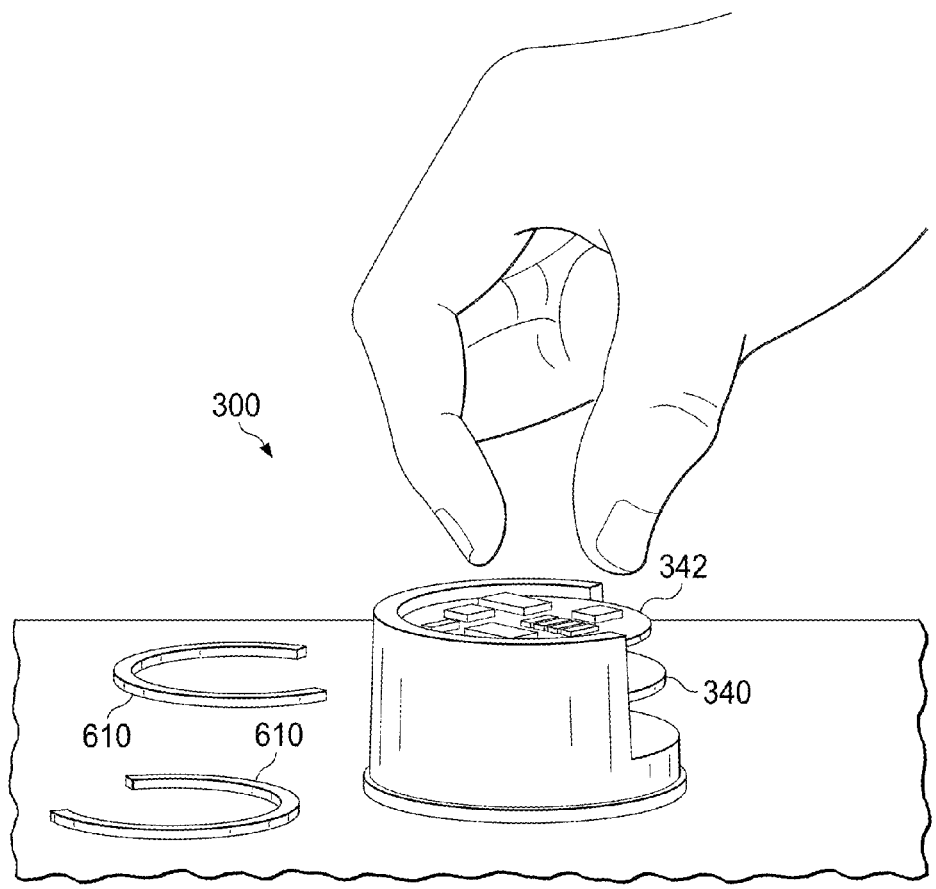
FIG. 6A illustrates manual insertion of a subassembly onto a top surface of a partially fabricated housing according to embodiments of the present disclosure.

FIG. 6A illustrates manual insertion of a subassembly onto a top surface of a partially fabricated housing according to embodiments of the present disclosure. Examples of subassemblies include bottom CCA 340, second CCA 342, bottom lens 350, middle lens 352, upper lens 354, top lens 356, bottom 520, and top lens 535. In the particular example shown in FIG. 6A, the bottom CCA 340 has been inserted and fabricated within segment 1 of the missile seeker 300. An employee is inserting the second CCA 342 onto a top layer of segment 2 and positioning the second CCA 342 into the correct disposition enabling the missile seeker 300,400 to operate properly upon completion of fabricating the remaining layers of segments 3-9.

In certain embodiments, such as described below in reference to FIG. 9, the width of FDM system extrude head causes collisions with a convex or otherwise raised surface subassembly that is to be encapsulated with the FDM fabricated housing. As an example, the FDM system is configured to fabricate one or more spacers 610, such as during deposition of the layers of the base 330. During a pause between fabrication of consecutive layers, such as during a placement of a raised surface subassembly (for example, second CCA 342) one or more of the spacers 610 are placed onto a top layer of build material or atop the raised surface of the subassembly to prevent collisions between the extrude head and a raised surface subassembly, such as a CCA. After placement of the spacers 610, the extrude head deposits layers of heated build material onto spacers, thereby incorporating the spacers into the housing. In certain embodiments, the FDM extrude head is narrow enough to avoid collisions with a raised surface subassembly without using a spacer 610. In certain embodiments, spacers are not needed to encapsulate a raised surface subassembly.

Figure 6B:
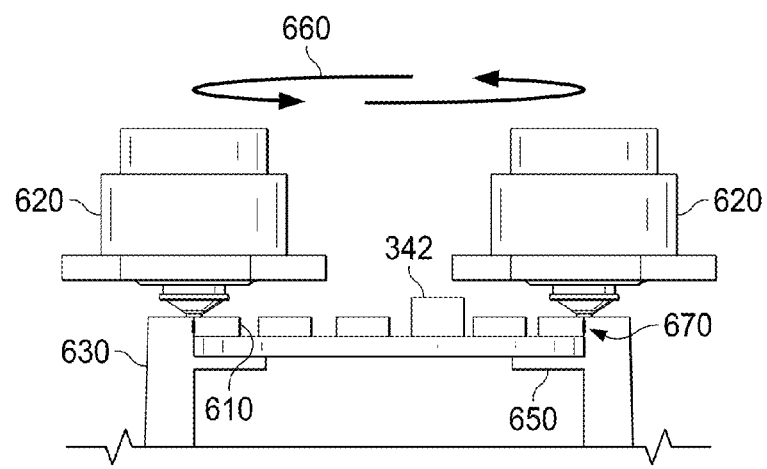
FIG. 6B illustrates an extrusion nozzle positioned to extrude material onto a top surface of a partially fabricated housing and a spacer according to embodiments of the present disclosure.

FIG. 6B illustrates an extrusion nozzle 620 positioned to extrude material onto a top surface of a partially fabricated housing 630 and a spacer 610 (shown as hatched) according to embodiments of the present disclosure. FIG. 6B shows a cross section of the partially fabricated housing 630, spacer 610, and raised surface CCA 342 placed within the housing 630 disposed atop a seat 650 configured to receive that specific CCA 342. The outer circumference of the spacer 610 is smaller than the inner circumference of the partially fabricated housing 630, enabling the spacer to be positioned atop the outer surface of the CCA 342 (or other raised surface subassembly) yet within an inner surface of the partially fabricated housing 630. The extrusion nozzle 620 is positioned to deposit layers of heated build material onto spacers, thereby fixing the spacer 610 in place, in immediately physical contact with the top of the CCA 342 within the housing. As an example, the extrusion head can move in a nonlinear motion 660, moving only to the areas where material is to be deposited, such as an inner circumference of the spacer 610, such as the boundary 670 between the housing 620 and spacer 610, or the outer circumference of the housing 630. This nonlinear motion allows the extrusion head to move around tall components 342 and avoid collisions.

Figure 7:
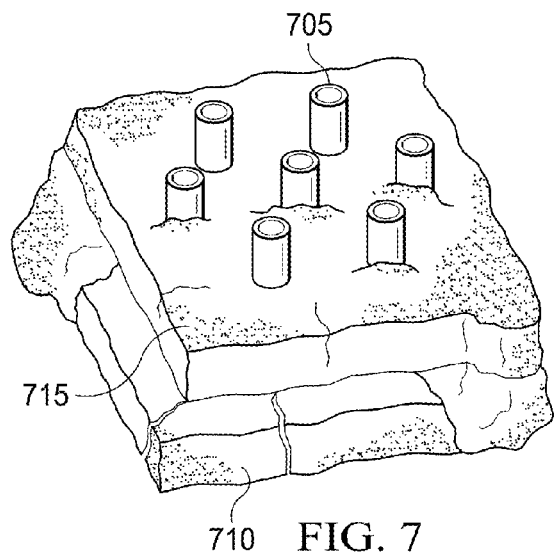
FIG. 7 illustrates solid tubes fabricated using another type of additive manufacturing other than FDM according to the present disclosure.

FIG. 7 illustrates hollow tubes fabricated using another type of additive manufacturing other than FDM, such as stereolithography or a metal sintering AM process. For example, to generate a first layer of a 3D print using stereolithography, a top surface of vat of liquid resin is cured by a heating element, such as a laser. Then, the first layer of cured resin is lowered beneath the top surface of the liquid resin in the vat, enabling the heating element to generate the next layer by again curing the top surface of the liquid resin. Upon completion of the 3D print, the 3D print is raised out of the vat of liquid resin.

Referring to FIG. 5A, if stereolithography were used to create the lens barrel 500, the cavity between lenses 520 and 535 (also for example, the blind cavity between bottom lens 350 and middle lens 352) would be full of uncured liquid resin. That is, the cavity would not be an empty cavity because the uncured liquid resin would prevent or otherwise impede the direct transmission of light between the bottom lens 520 and the lens 535.

Referring to FIG. 7, as a further example, to generate a 3D print of seven hollow cylindrical tubes 705 using a metal sintering AM process, a thin layer 710 of powdered metal is printed onto a build platform, and then a heat source, such as a laser or an electron beam is used to melt the printed powder. Next, the melted layer of metal is then lowered, enabling a subsequent layer 715 of printed powder to be deposited and selectively melted on top of the previous layer. The iterations of depositing layers 710, 715 of powdered metal generates powdered residual material is disposed within any cavity of the 3D printed tube 705. For example, if a closed top surface where fabricated at a top of the tube 705, then the unmelted metal powder residual material within the tube 705 would be sealed within and unable to be removed from the blind, enclosed cavity, such as the cavity between lenses 520 and 535 (also for example, the blind cavity between bottom lens 350 and middle lens 352). According to the present disclosure, a blind cavity is empty space (for example, an air gap) that is enclosed within a housing, between inserted subassemblies, and the empty space is physically inaccessible upon completion of fabrication of the housing without destroying the housing. In a missile seeker, the blind cavity within the optical housing, also referred to as the lens barrel, must be free of residual residue. For example, a missile seeker can include blind cavities between optical elements and circuit cards. Accordingly, this metal sintering AM process is not suitable for creating empty blind cavities.

Figure 8:
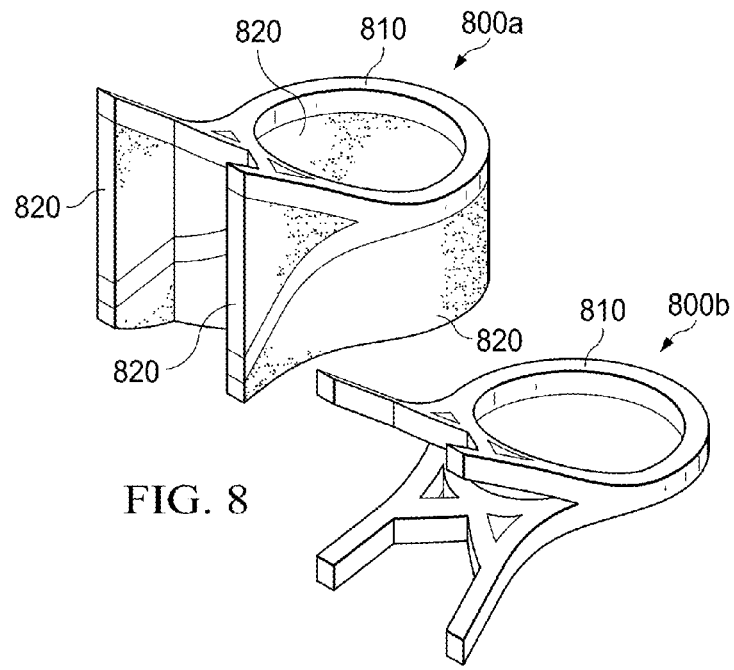
FIG. 8 illustrates a first part having acutely angled portions fabricated using a FDM process and using support material, and a second part identical to the first part without any support material present.

FIG. 8 illustrates a 3D print 800a of a part 810 having acutely angled portions fabricated using a FDM process and using support material 820, and a 3D print 800b of a part identical to the first part 810 without any support material present. The first 3D print 800a and the second 3D print 800b are generally referred to as the 3D print 800. The first part 810 within the first 3D print 800a and the second part 810 of the second 3D print 800b are generally referred to as the part 810.

As a specific non-limiting example, the 3D print 800b represents the 3D print 800a after removal of the supporting material 820. In other words, 3D print 800a is the 3D print 800b before undergoing a residual material removal process.

The control system 170 includes a program of instructions configured to cause the FDM system 100, 200 to deposit layers of build material on top of each other at angles of 45 degrees or less. If the part 810 were to include a completely horizontal ledge portion, then support material would be necessary to support any subsequent layer deposited at an angle greater than 45 degrees relative to the immediately preceding layer deposited. The control system 170 includes a program of instructions configured to cause processing circuitry of the FDM system 100, 200 to grow (namely, to fabricate) a lens barrel (also referred to as an optics housing) by depositing layers of build material at non-cantilevered edges. That is, the layers of the lens barrel including a blind cavity does not include any ledges disposed an angle greater than 45 degrees, unless the next layer is being deposited directly onto an inserted part (for example, an optical, mechanical or electrical subassembly) and that inserted part supports the layer being printed. As a result, support material, which must be removed upon completion of the 3D print, is not necessary to fabricate a housing including a blind cavity.

FIG. 9 illustrates an extrusion nozzle in an incorrect, damage-causing disposition relative to a convex lens according to embodiments of the present disclosure. For example, certain FDM systems that include a horizontal only coordinate system require the extrusion head (also referred to as print heat) 905 to translate the entire width of the printable plane in a horizontal only direction. This type of translation is similar to the printer head translation of a dot-matrix paper printer, which moves in a horizontal line across the entire width of the page, and then the page moves up, enabling the dot-matrix printer head to translate the entire width of the page in the opposite direction, but along the same line of the one dimensional, horizontal only coordinate system. The horizontal only extrusion head 905 collides with the convex subassembly lens 350 while attempting to deposit material on top of the lens to encapsulate or hold the lens in place. By comparison, referring to FIGS. 5A-5C, the horizontal only extrusion head 905 would be suitable for depositing a layer of build material on top of a flat lens 520, 535 because all parts of the flat lens 520, 535 would be disposed beneath the entire horizontal only extrusion head 905, and a collision would be avoided.

Certain technical advantages of the present disclosure include a method to fabricate a blind, isolated component lodged within the walls of an encapsulating housing. During manufacture, access to a cavity in order to insert parts is no longer necessary because the FDM system according to the present disclosure fabricates the mechanical structure around the subassembly (that is, a previously inserted part). The AM FDM process according to embodiments of the present disclosure eliminates a need for procuring a seeker housing, eliminates securing subassemblies in a fixed disposition by adhesives, fasteners and torqueing. The AM FDM process according to embodiments of the present disclosure allows a manufacture to support a build lot size of a single missile seeker since there is no tooling to be set up and minimal manual labor. For example, the controller 170 executes a set of instructions corresponding to build a first type of missile seeker, such as the seeker 1100. After completion of the one seeker 1000, the controller 170 executes another set of instructions corresponding to build a second type of missile seeker, such as the seeker 1100, with no tooling change required. The AM FDM process according to embodiments of the present disclosure generates a single 3D print that encompasses an electronics housing, an optics housing (also referred to as a lens barrel), and a nose cone. In comparison to other methods of assembling the seeker 1000, multiple mechanical features including an electronic housing, an optics housing, and a nose cone are mechanically coupled to each other using assembly methods discussed above (namely, screws, retainers, adhesive bonding, machining, casts, molds, and procurement).

The AM FDM process according to embodiments of the present disclosure generates a single 3D print that encapsulates subassemblies that are common to various types of missile seekers. For example, a 3D printed electronics housing 410 is configured to encapsulate the common subassemblies that are electronic: the first CCA 340 and the second CCA 342. The 3D printed electronics housing 410 includes a blind cavity 328.

Figure 12:
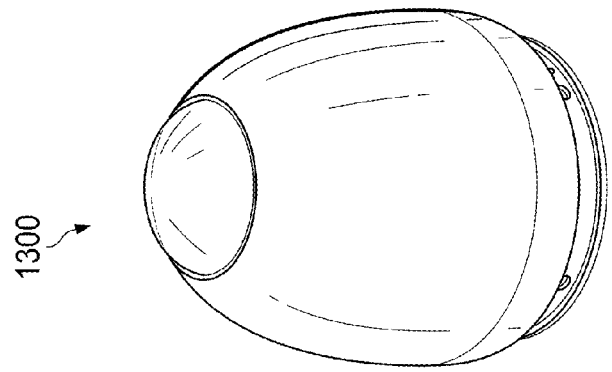
Figure 11:
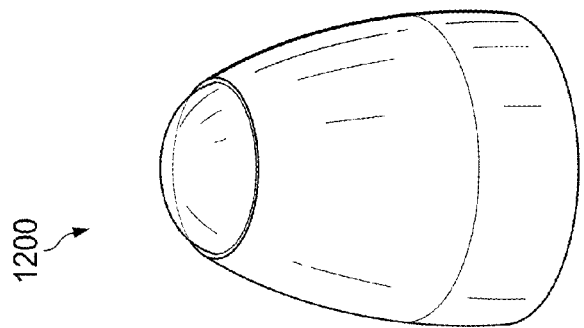
Figure 10:
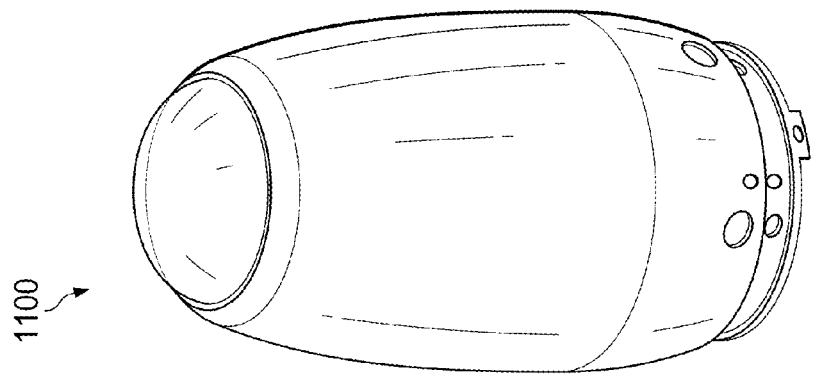

Also for example, a 3D printed electronics housing is configured to encapsulate the common subassemblies that are optical: the bottom lens 350, the middle lens 352, and the upper lens 354. Various types of missile seekers 1000, 1100, 1200, 1300, 1400 can use the same process for 3D printed optical housings. That this, additive manufacturing according to embodiments of this disclosure support "mass customization" and builds of a lot size of 1. For example, on day one manufacturing a single custom built mechanical housing for the missile seeker 1300 of FIG. 12, then on the next day, manufacturing a different single custom built missile seeker 1400.

The various types of missile seekers 1000, 1100, 1200, 1300, 1400 can use certain subassemblies that are unique to the particular type of missile seeker, such as the top lens 356 and the electro-mechanical assembly that are unique to the type of missile seeker 1000. The various types of missile seekers 1000, 1100, 1200, 1300, 1400 can use other common subassemblies such as a desiccant surrounding an optical housing, a detector, an electro-mechanical assembly mount, and a sensor mount ring.

FIGS. 10-14 illustrate various types of missile seekers 1000, 1100, 1200, 1300, 1400 fabricated using common subassemblies (for example, the bottom lens 350, and the middle lens 352) and the FDM methods of according to embodiments of the present disclosure.

Figure 15:
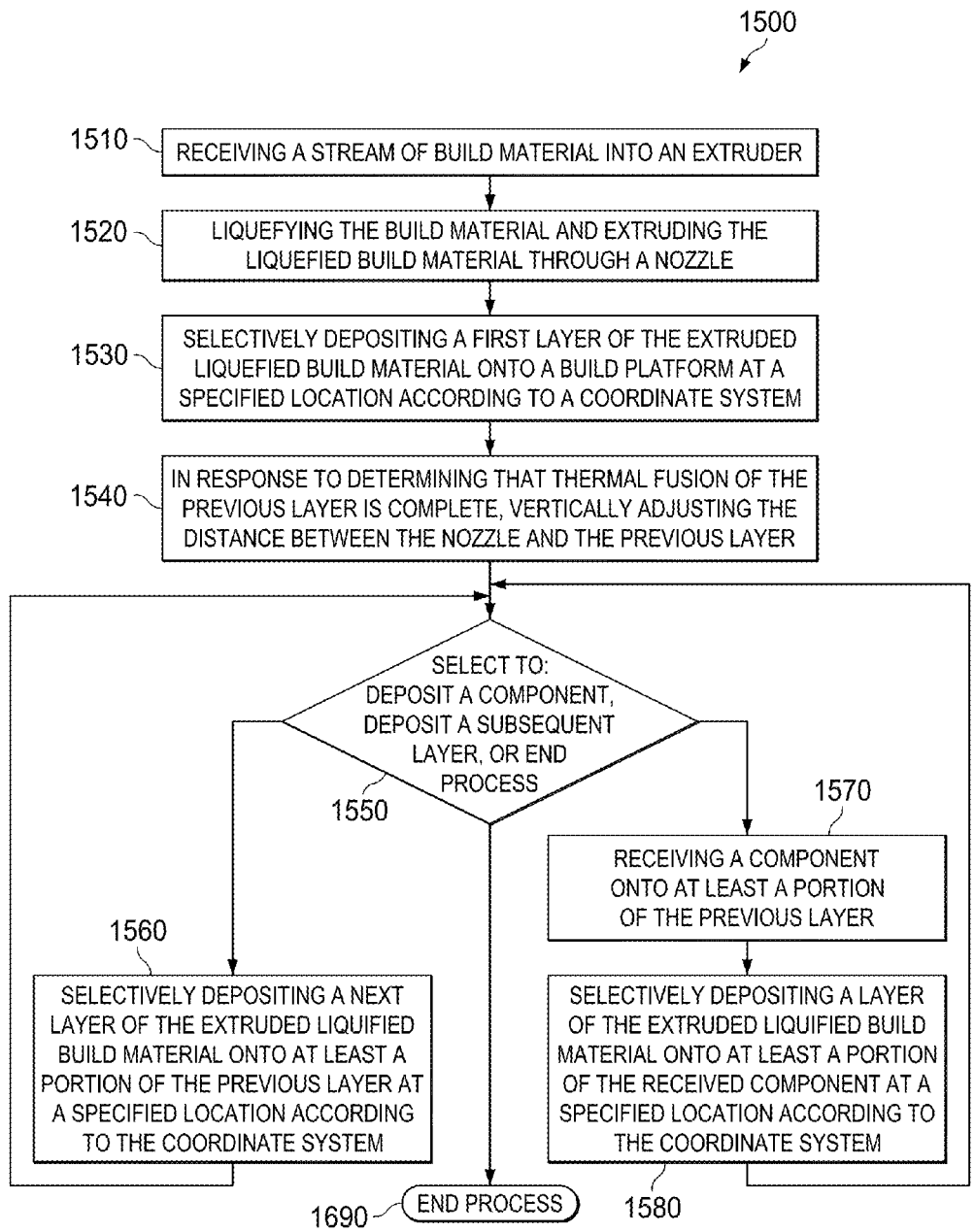
FIG. 15 illustrates an AMFDM process according to embodiments of the present disclosure.

FIG. 15 illustrates an AM FDM process according to embodiments of the present disclosure. The embodiment of the AM FDM process 1500 shown in FIG. 15 is for illustration only. Other embodiments could be used without departing from the scope of this disclosure. The controller including processing circuitry of the AM FDM systems according to embodiments of the present disclosure is configured to implement the process 1500. In reference to FIG. 15, the controller, together with the associated components with the AM FDM systems according to embodiments of the present disclosure are referred to as the system.

In block 1510, the system receives a stream of build material into an extruder.

In block 1520, the system liquefies the build material and extrudes the liquefied build material through a nozzle of the extruder. For example, the system heats the build material to a temperature specified by the controller. The specified temperature is above the melting point of the build material. When the build material is heated to a liquid or semi-molten phase based on the specified temperature and type of build material.

In block 1530, the system selectively deposits a first layer of the extruded liquefied build material onto a build platform at a specified location according to a coordinate system. The coordinate system can be a horizontal only coordinate system (for example, an x-axis coordinate system), or a bidirectional coordinate system (for example, the x-y axes coordinate system).

In block 1540, in response to determining thermal fusion of the previous layer is complete, the system vertically adjusts the distance between the nozzle and the previous layer. In certain circumstances, the previous layer is the first layer.

In block 1550, the controller determines or otherwise makes a selection regarding what will be deposited next. That is, the controller selects one of to end the process without further depositing anything on top of the previous layer; to deposit a subassembly component on top of the previous layer; and to deposit a next layer of the extruded liquefied build material onto at least a portion of the previous layer at a specified location according to the coordinate system. For example, the controller specifies the specified location according to the coordinate system of the FDM system.

In block 1560, in response to a selection to consecutively deposit a subsequent layer on top of the previous layer, the system selectively deposits a next layer of the extruded liquefied build material onto at least a portion of the previous later at a specified location according to the coordinate system. The specified location can include multiple specified locations in a line or disposed along a path mapped by the controller. Next, the process 1500 returns to block 1550.

In block 1570, in response to a selection to deposit a component on top of the previous layer, the system receives a component onto at least a portion of the previous layer. For example, the system receives a subassembly onto at the portion of the previous layer by manual placement. In certain embodiments, the system includes a robotic pick and place capability configured to pick the selected component to be placed on top of the previous layer. The robotic pick and place is further configured to place the selected component onto the previous layer at a location specified by the controller. The robotic pick and place eliminates any human touch in the process of fabricating the 3D print (for example, the missile seeker encapsulating housing).

The amount of time to manufacture a missile seeker using other processes that involve mechanical fasteners and adhesives required approximately 66 hours of cycle time including both manual touch labor and material curing, including approximately 2.8 hours of manual touch labor. According to embodiments of the present disclosure, the amount of time to fabricate a 3D printed missile seeker requires approximately 15.5 hours of cycle time including both machine build times and manual touch labor, including approximately 9 minutes of manual touch labor. In certain embodiments that include a robotic or inanimate device to place the subassembly component on top of the previous layer, the process 1500 does not require manual touch labor. The use of robotic placement of subassemblies decreases build cycle time and eliminates the innate variability (that is imprecision) of using manual touch labor.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

In block 1580, after receiving the component, the system selectively deposits a layer of the extruded liquefied build material onto at least a portion of the received component at a specified location according to the coordinate system. Next, the process 1500 returns to block 1550.

In block 1590, in response to a selection to end the process, the system terminates the process.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed:

1. An apparatus, comprising:
  a controller configured to transmit control signals to a fused deposition modeling (FDM) extrusion head, the FDM extrusion head comprising an extrusion nozzle configured to expel heated thermofusible material through an extrusion tip,
  wherein the controller is configured to:
    determine at least one specified location to deposit the heated thermofusible material according to a coordinate system,
    cause the extrusion nozzle to selectively deposit a first layer of the heated thermofusible material onto a build platform,
    in response to determining that thermal fusion of the first layer is complete, vertically adjust the distance between the extrusion nozzle and the first layer,
    pause to receive a subassembly onto at least a portion of the first layer and a spacer on a portion of a top surface of the subassembly, and
    cause the extrusion nozzle to deposit a second layer immediately on top of the spacer, wherein depositing the second layer fixes the spacer in physical contact with the top surface of the subassembly and fixes the subassembly between the spacer and the first layer.

2. The apparatus of claim 1, wherein the controller is configured to: cause the extrusion nozzle to selectively deposit a third layer of the heated thermofusible material onto at least a portion of the received subassembly at a specified location according to the coordinate system.

3. The apparatus of claim 1, wherein the subassembly is received onto at least the portion of the first layer by a robotic device placing the subassembly onto at least the portion of the first layer.

4. The apparatus of claim 1, wherein the controller is configured to selectively move the FDM extrusion head, and wherein the selective move prevents collision of the subassembly with the apparatus.

5. The apparatus of claim 1, wherein the subassembly comprises an optical component or an electrical component.

6. The apparatus of claim 1, wherein the subassembly comprises a mechanical component.

7. The apparatus of claim 1, wherein a portion of the subassembly projects vertically above a plane defining a top surface of the spacer, and the controller is configured to cause the FDM extrusion head to move nonlinearly around the projecting portion while depositing the second layer.

8. A system, comprising:
a controller; and
a fused deposition modeling (FDM) extrusion head configured to receive control signals from the controller, the FDM extrusion head comprising
an extrusion nozzle configured to expel heated thermofusible material through an extrusion tip;
wherein the controller is configured to:
determine at least one specified location to deposit the heated thermofusible material according to a coordinate system,
cause the extrusion nozzle to selectively deposit a first layer of the heated thermofusible material onto a build platform,
in response to determining that thermal fusion of the first layer is complete, vertically adjust the distance between the extrusion nozzle and the first layer,
pause to receive a subassembly onto at least a portion of the first layer and a spacer on a portion of a top surface of the subassembly, and
cause the extrusion nozzle to deposit a second layer immediately on top of the spacer, wherein depositing the second layer fixes the spacer in physical contact with the top surface of the subassembly and fixes the subassembly between the spacer and the first layer.

9. The system of claim 8, wherein the controller is configured to: cause the extrusion nozzle to selectively deposit a third layer of the heated thermofusible material onto at least a portion of the received subassembly at a specified location according to the coordinate system.

10. The system of claim 8, wherein the subassembly is received onto at least the portion of the first layer by a robotic device placing the subassembly onto at least the portion of the first layer.

11. The system of claim 8, wherein the controller is configured to selectively move the FDM extrusion head, and wherein the selective move prevents collision of the subassembly with the FDM extrusion head.

12. The system of claim 8, wherein the subassembly comprises an electrical component or an optical component.

13. The system of claim 8, wherein the subassembly comprises a mechanical component.

14. The system of claim 8, wherein the FDM extrusion head further comprises:
an input channel configured to receive a stream of thermofusible material;
a mechanical driver configured to, in response to activation, force the stream of thermofusible material into a liquefier channel;
a liquefier configured to heat the stream of thermofusible material within the liquefier channel to a specified temperature to form the heated thermofusible material, the specified temperature above a melting point of the thermofusible material.

15. The system of claim 8, wherein a portion of the subassembly projects vertically above a plane defining a top surface of the spacer, and the controller is configured to cause the FDM extrusion head to move nonlinearly around the projecting portion while depositing the second layer.

16. A non-transitory computer-readable medium encoded with executable instructions for use with a controller and a fused deposition modeling (FDM) system comprising an extrusion nozzle configured to expel heated thermofusible material through an extrusion tip, the instructions when executed, cause processing circuitry within the controller to:
determine at least one specified location to deposit the heated thermofusible material according to a coordinate system,
cause the extrusion nozzle to selectively deposit a first layer of the heated thermofusible material onto a build platform,
in response to determining that thermal fusion of the first layer is complete, vertically adjust the distance between the extrusion nozzle and the first layer,
pause to receive a subassembly onto at least a portion of the first layer and a spacer on a portion of a top surface of the subassembly, and
cause the extrusion nozzle to deposit a second layer immediately on top of the spacer, wherein depositing the second layer fixes the spacer in physical contact with the top surface of the subassembly and fixes the subassembly between the spacer and the first layer.

17. The computer-readable medium of claim 16, wherein the subassembly is received onto at least the portion of the first layer by a robotic device placing the subassembly onto at least the portion of the first layer.

18. The computer-readable medium of claim 16, further comprising instructions that cause the FDM system to: selectively move the FDM extrusion head, wherein the selective move prevents collision of the subassembly with the apparatus.

19. The computer-readable medium of claim 16, wherein the subassembly comprises an optical component or an electrical component.

20. The computer-readable medium of claim 16, wherein the subassembly comprises a mechanical component.

* * * * *